United States Patent [19]

Wininger

[11] 4,329,446

[45] May 11, 1982

[54] METHOD OF PREPARING CELLULOSE ESTERS

[75] Inventor: Brice S. Wininger, Kingsport, Tenn.

[73] Assignee: Eastman Kodak Company, Rochester, N.Y.

[21] Appl. No.: 182,515

[22] Filed: Aug. 29, 1980

[51] Int. Cl.$^3$ ............................................. C08B 3/06
[52] U.S. Cl. ........................................ 536/69; 536/63
[58] Field of Search ................................... 536/63, 69

[56] References Cited

U.S. PATENT DOCUMENTS 2,827,455  3/1958  Wells et al. ........................... 536/63
2,861,069  11/1958  Touey et al. .......................... 536/69

Primary Examiner—A. Lionel Clingman
Attorney, Agent, or Firm—John F. Stevens; Daniel B. Reece, III

[57] ABSTRACT

Disclosed is a method of preparing lower fatty acid esters of cellulose which comprises esterifying at a temperature of between about 75° C. and about 110° C. a cellulose compound having esterifiable hydroxyl groups with an esterifying bath comprising an organic acid anhydride, a diluent, and from about 0.3% to about 3.0% by weight, based on the weight of cellulose, of a catalyst selected from p-toluene sulfonic acid, methane sulfonic acid, methane disulfonic acid or m-benzene disulfonic acid.

6 Claims, No Drawings

METHOD OF PREPARING CELLULOSE ESTERS

TECHNICAL FIELD

This invention relates to the preparation of lower fatty acid esters of cellulose in which certain sulfonic acids are used as esterification catalysts at higher than normal reaction temperatures.

BACKGROUND ART

In the usual preparation of lower fatty acid esters of cellulose, sulfuric acid is the catalyst employed. This acid is very effective in that it promotes esterification of the cellulose under relatively mild conditions but it has the disadvantage in that it combines with cellulose and the cellulose ester obtained often contains sulfuric acid radicals. Ordinarily these sulfate groups can be removed from the final product by a prolonged hydrolysis under very carefully controlled conditions. However, even after this treatment, the product may contain sufficient combined sulfuric acid to render it unstable to prolonged heating at elevated temperatures such as may be encountered in molding operations or the like.

In order to eliminate this disadvantage which may be encountered when sulfuric acid catalyst is employed, various so-called "non-combining" acids have been suggested as catalysts in cellulose esterification processes. Perchloric acid is an example of such an acid catalyst. However, perchloric acid has several disadvantages when used as a catalyst. For instance it is corrosive on stainless steel equipment. It is explosive in contact with readily oxidizable materials.

According to U.S. Pat. No. 2,861,069, other strong acid catalysts such as phosphoric acid, hydrochloric acid, methane sulfonic acid, toluene sulfonic acid and the like have also been disclosed as useful noncombining catalysts in the esterification of cellulose. In addition, weak salts of strong acids such as zinc chloride, ammonium sulfates and the like have been suggested.

According to the article "Catalysts for Acetylation of Cellulose" (Industrial and Engineering Chemistry, May, 1961, page 363) certain sulfonic acids have been known as catalysts for the acetylation of cellulose. There is no disclosure, however, that by using abnormally low concentration of catalysts, high reaction temperatures may be endured.

Commercial cellulose esterifications, for the most part, are consequently conducted using relatively large quantities of sulfuric acid as the reaction catalyst. Sulfuric acid is a very strong acid catalyst for cellulose esterification and requires considerable reaction temperature manipulation (cooling) in order to avoid excessive degradation (reduction) of the cellulose molecular weight. Sulfuric acid also combines with the cellulose during esterification to form a cellulose sulfate ester which decreases the thermal stability of the cellulose organic ester. Other cellulose esterification catalysts such as perchloric acid, hydrochloric acid, and zinc chloride are well known in the art as noncombining catalysts. However, these catalysts are either too corrosive (perchloric and hydrochloric acid) or too much (50 to 100% based on weight of cellulose) is required for efficient reaction.

Certain sulfonic acids, e.g., para-toluene sulfonic acid, also are known in the art as cellulose esterification catalysts but again large amounts (up to 50 wt. % based on cellulose) of catalyst have been considered necessary at the normal reaction temperature (40°–50° C.) and high quality, high α-cellulose content pulps are required to obtain an acceptable quality product.

The present invention is believed to be the first realization that very small amounts of certain sulfonic acids may be used at reaction temperatures of 75°–110° C. to obtain acceptable quality cellulose esters from low α-cellulose (e.g., viscose grade) wood pulps.

DISCLOSURE OF INVENTION

The present invention provides a method of preparing lower fatty acid esters of cellulose which comprises esterifying at temperatures of between about 75° C. and about 110° C. (preferably about 85°–95° C.) a cellulose compound having esterifiable hydroxyl groups with an esterifying bath comprising an organic acid anhydride, a diluent, and from about 0.3% to about 3.0% by weight (preferably about 0.5–1.0%), based on the weight of cellulose, of a catalyst selected from the group consisting of p-toluene sulfonic acid, methane sulfonic acid, methane disulfonic acid and m-benzene disulfonic acid, the weight ratio of the bath to the cellulose being between about 5:1 to about 10:1. Use of small amounts of catalyst and relatively high esterification temperatures are found to be especially advantageous.

BEST MODE FOR CARRYING OUT THE INVENTION

According to the present invention, small amounts of particular sulfonic acid catalysts are used in the esterification of cellulose allowing the rection temperature to rise to between about 75° C. and about 110° C. Such reaction temperatures are advantageous, because as the exothermic reaction causes a rise in temperature, less cooling is required than in processes where the reaction temperature must be lowered a greater amount.

The catalysts used in accordance with the present invention are sulfuric acids, namely I p-toluene sulfonic acid (pTSA)

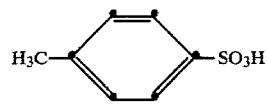

II methane sulfonic acid (MeSA)

CH$_3$SO$_3$H

III methane disulfonic acid (MeDSA)

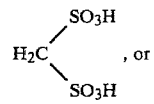, or

IV m-benzene disulfonic acid (m-BDSA)

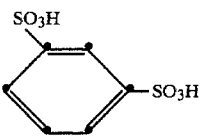

These sulfonic acid catalysts are used in amounts of from about 0.3% to about 3.0%, based on the weight of cellulose. Preferably, about 0.5% to about 1.0%, based on the weight of cellulose, is used.

Although the process according to this invention is especially useful in the acetylation of low α-cellulose, such as viscose grade cellulose wood pulp, it may be used in the acetylation of any of the conventional types of cellulose.

The catalysts in accordance with the invention are also useful in esterification processes which involve the esterification of cellulose compounds containing free and esterifiable hydroxyl groups. For instance, partially substituted cellulose esters or cellulose ethers can be esterified by lower fatty acid anhydrides and the reaction catalyzed as described herein. Some cellulose esters the preparation of which the use of catalysts described herein is particularly adapted are cellulose acetate, cellulose acetate propionate, cellulose acetate butyrate, cellulose propionate and cellulose butyrate.

In the acetylation process as practiced in this invention, the cellulose wood pulp is esterified in a mixture of acetic and/or butyric acid (preferably about 2 to 3 parts per part of cellulose); and lower fatty acid anhydride (about 3 parts) resulting in about 5-6 parts total liquid per part of cellulose, and using from about 0.3 to about 3 wt. % (based on the weight of cellulose) of a sulfonic acid selected from the group consisting of p-toluene sulfonic acid, methane sulfonic acid, methane disulfonic, and m-benzene disulfonic acid. Although it is preferred that the liquid bath/cellulose ratio be about 5 or 6 to 1, larger amounts of liquid bath may sometimes be used to increase this ratio up to about 10 to 1. The reaction is carried out at temperatures from 75° to 110° C. (85°–95° C. preferred) until a grain-free, smooth reaction solution is obtained. Sufficient aqueous acetic acid may be added to destroy the excess acetic anhydride and to provide water in the reaction solution for hydrolysis which is carried out at about 100° C. until the desired acetyl content is obtained on the cellulose acetate. In the preferred process the sulfonic acid catalyst is neutralized with sodium acetate prior to hydrolysis at about 100° C. The cellulose acetate, after hydrolysis, is precipitated, washed, stabilized, and dried according to methods well known in the art.

In the high temperature acetylation process as described in this invention, the cellulose pulp does not require any special activation with water, aqueous acetic acid, or acid catalyst in order to achieve adequate reactivity. It is to be understood that the process of this invention is applicable to high quality, high α-cellulose content wood pulps, but is especially useful in connection with the low α-cellulose pulps described in the examples cited herein.

The following examples are submitted for a better understanding of the invention. Conventional esterification techniques are used with the catalysts according to this invention as described above.

| Example | Sulfonic Acid Catalyst Type | Sulfonic Acid Catalyst Amount, Wt. %[b] | Maximum Reaction Temp. °C. | Reaction Time, Min.[a] | Acetyl,[c] Wt. % | Acetone I.V. | 4:1, Acetone:Ester Solution Haze[d] | 4:1, Acetone:Ester Solution Color[d] | 4:1, Acetone:Ester Solution Gel Content |
|---|---|---|---|---|---|---|---|---|---|
| 1 | pTSA | 0.5 | 109° | 125 | 39.8 | 1.46 | 9 | 5–6 | very little |
| 2 | pTSA | 1.0 | 109° | 70 | 40.3 | 1.35 | 9–10 | 6–7 | none |
| 3 | pTSA | 1.0 | 112° | 60 | 40.5 | 1.35 | 9 | 1–2 | none |
| 4 | pTSA | 3.0 | 103° | 75 | 39.8 | 1.12 | 1 | 10 | none |
| 5 | MeSA | 0.87 | 98° | 40 | 40.6 | 1.21 | 2 | 6–7 | none |
| 6 | MeSA | 1.0 | 98° | 60 | 40.2 | 1.61 | 3 | 2–3 | none |
| 7 | MeSA | 1.0 | 105° | 60 | 40.4 | 1.32 | 2–3 | 3–4 | none |
| 8 | MeDSA | 0.87 | 95° | 45 | 41.7 | 1.46 | 3–4 | 1–2 | some[e] |
| 9 | MeDSA | 0.5 | 75° | 63 | 41.9 | 2.06 | 4 | 1–2 | much[e] |
| 10 | MeDSA | 0.5 | 107° | 20 | 41.5 | 1.39 | 2–3 | 2–3 | none |
| 11 | m-BDSA | 0.5 | 90° | 70 | 41.8 | 2.15 | 10 | 1–2 | very much[e] |
| 12 | m-BDSA | 0.5 | 95° | 120 | 42.3 | 2.06 | 10 | 1–2 | very much[e] |
| 13 | m-BDSA | 1.0 | 80° | 45 | 42.0 | 1.83 | 7–8 | 2–3 | very much[e] |

[a]Time required to obtain a grain-free, fiber-free acid dope.
[b]Amount based on weight of dry cellulose; viscose grade wood pulp used in all acetylations.
[c]After 9.5 to 10 hrs. hydrolysis at 99°–103° C. with 15% water present in hydrolysis solution.
[d]Relative values based on a scale of 1 (very low haze and color cotton linters acetate) to 10 (extremely hazy, opaque, light amber color)
[e]Probably due to the poor acetone solubility resulting from high acetyl (42%) and the very high acetone I.V.'s.

Inherent viscosity (I.V.) is measured by dissolving 0.25 g. of cellulose ester in 100 ml. of acetone solvent at 25°±0.10° C.

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

I claim:

1. A method of preparing lower fatty acid esters of cellulose which comprises esterifying at a temperature of between about 75° C. and about 110° C. a cellulose compound having esterifiable hydroxyl groups with an esterifying bath comprising an organic acid anhydride, a diluent, and from about 0.3% to about 3.0% by weight, based on the weight of cellulose, of a catalyst selected from the group consisting of p-toluene sulfonic acid, methane sulfonic acid, methane disulfonic acid and m-benzene disulfonic acid, the weight ratio of said bath to the cellulose being between about 5:1 to about 10:1.

2. A method according to claim 1 wherein the esterification is carried out at a temperature of about 85°–95° C.

3. A method according to claim 1 wherein said catalyst is present in an amount of from about 0.5 to about 1.0% based on the weight of cellulose.

4. A method according to claim 1 wherein the weight ratio of said bath to said cellulose is between about 5:1 and about 6:1.

5. A method according to claim 1 wherein the ester of cellulose is acetate.

6. A method of preparing lower fatty acid esters of cellulose which comprises esterifying at a temperature of between about 85° C. and about 95° C. a cellulose compound having esterifiable hydroxyl groups with an esterifying bath comprising an organic acid anhydride, a diluent, and from about 0.5% to about 1.0% by weight, based on the weight of cellulose, of a catalyst selected from the group consisting of p-toluene sulfonic acid, methane sulfonic acid, methane disulfonic acid and m-benzene disulfonic acid, the weight ratio of said bath to the cellulose being between about 5:1 to about 10:1.

* * * * *